US008121564B2

(12) United States Patent
Behzad

(10) Patent No.: US 8,121,564 B2
(45) Date of Patent: Feb. 21, 2012

(54) RADIO RECEIVER WITH SHARED LOW NOISE AMPLIFIER FOR MULTI-STANDARD OPERATION IN A SINGLE ANTENNA SYSTEM WITH LOFT ISOLATION AND FLEXIBLE GAIN CONTROL

(75) Inventor: Arya Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 609 days.

(21) Appl. No.: 11/711,721

(22) Filed: Feb. 28, 2007

(65) Prior Publication Data

US 2007/0207752 A1  Sep. 6, 2007

Related U.S. Application Data

(60) Provisional application No. 60/778,846, filed on Mar. 6, 2006.

(51) Int. Cl.
*H04B 7/08* (2006.01)

(52) U.S. Cl. ...... 455/132; 455/63.1; 455/78; 455/550.1; 455/552.1; 455/575

(58) Field of Classification Search ................. 455/426, 455/427, 552, 12.1, 3.02, 132, 133, 188.1, 455/189.1, 190.1, 91.11
See application file for complete search history.

(56) References Cited

U.S. PATENT DOCUMENTS

| | | | | |
|---|---|---|---|---|
| 5,423,064 A * | 6/1995 | Sakata | | 455/437 |
| 5,881,369 A * | 3/1999 | Dean et al. | | 455/78 |
| 7,266,361 B2 * | 9/2007 | Burdett | | 455/334 |
| 2001/0041584 A1 * | 11/2001 | Watanabe | | 455/553 |
| 2002/0173337 A1 * | 11/2002 | Hajimiri et al. | | 455/552 |
| 2005/0130617 A1 * | 6/2005 | Burns et al. | | 455/253.2 |
| 2005/0186927 A1 * | 8/2005 | Hayashi et al. | | 455/232.1 |
| 2005/0197084 A1 * | 9/2005 | Hamasaki et al. | | 455/189.1 |
| 2006/0052131 A1 * | 3/2006 | Ichihara | | 455/552.1 |
| 2006/0281426 A1 * | 12/2006 | Galan | | 455/188.1 |
| 2007/0004447 A1 * | 1/2007 | Haartsen | | 455/552.1 |
| 2007/0207751 A1 | 9/2007 | Behzad et al. | | |
| 2008/0090514 A1 * | 4/2008 | Yegin et al. | | 455/3.02 |
| 2008/0139123 A1 | 6/2008 | Lee et al. | | |

* cited by examiner

*Primary Examiner* — Edward Urban
*Assistant Examiner* — Ganiyu Hanidu
(74) *Attorney, Agent, or Firm* — Sterne Kessler Goldstein & Fox PLLC

(57) ABSTRACT

A radio receiver is described that processes multiple wireless standards using a single antenna according to embodiments of the invention. The radio receiver includes a single antenna, and a low noise amplifier that is connected to the antenna, without an intervening power divider or power splitter. The output of the low noise amplifier feeds multiple wireless receivers in a parallel arrangement that are operating according to different communications standards, including for example a Bluetooth and a WLAN 802.11. Additional wireless standards and their corresponding receivers could be added as well. The input impedance of the low noise amplifier defines the impedance seen by the antenna, regardless of which operational standard is actually in use. Each signal path includes an additional low noise amplifier having a gain that can be customized for the particular signal path and receiver in use, and which also improves the reverse isolation between signal paths. Further, a switch can be added to one or more of the signal paths so as to further improve isolation when a particular path is not being used.

29 Claims, 3 Drawing Sheets

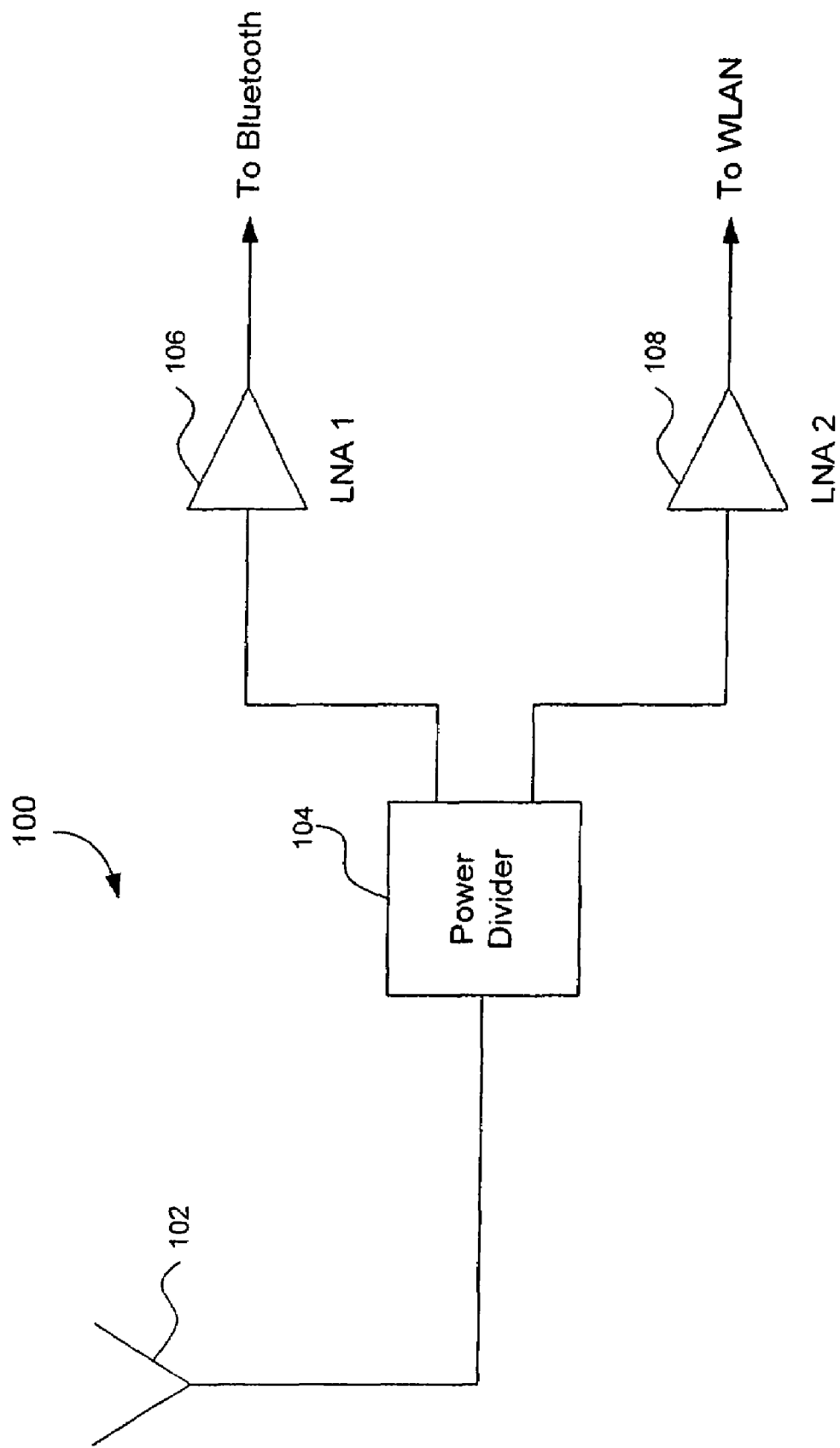
FIG. 1 (Conventional)

RADIO RECEIVER WITH SHARED LOW NOISE AMPLIFIER FOR MULTI-STANDARD OPERATION IN A SINGLE ANTENNA SYSTEM WITH LOFT ISOLATION AND FLEXIBLE GAIN CONTROL

This application claims the benefit of U.S. Provisional Application No. 60/778,846, filed on Mar. 6, 2006, which is incorporated by reference herein in its entirety.

BACKGROUND OF THE INVENTION

1. Field of the Invention

The present invention generally relates to a radio receiver system with a shared low noise amplifier in a multi-standard operation.

2. Background Art

Numerous wireless standards are available today for wireless networks and devices. These multiple standards can often operate in the same frequency bandwidth, but have different applications and uses. For example, both WLAN and Bluetooth operate in the same relative frequency space defined by the IEEE ISM band. Accordingly, a single receiver front-end can be used to support multiple radio standards. For example, both Bluetooth and WLAN (IEEE 802.11) can be processed using a common analog receiver front-end because their frequencies of operation are sufficiently close to each other. In a conventional receiver system, it is desirable to use a single antenna to support multiple radio standards to reduce part count and overall size.

FIG. 1 illustrates a conventional receiver system 100 that supports two radio standards, namely WLAN 802.11 and Bluetooth, using a single antenna. The conventional system 100 includes a single antenna 102, a power splitter 104, and two low noise amplifiers (LNA) 106 and 108. The power splitter 104 is used after the antenna 102 to provide the received signal to each one of the LNAs 106 and 108 for processing according to each standard, while maintaining the proper 50 ohm terminations on all ports. This results in a significant amount of signal power loss as seen by each one of the LNAs, even if no signal is being received for one of the standards. The signal power loss occurs because the power divider outputs are 3 dB lower than the input power. For example, in a system that is required to operate for both Bluetooth and WLAN in a single antenna configuration, a minimum of a 3 dB power penalty (and therefore noise figure [NF] penalty) occurs regardless of which standard is selected to receive the input signal.

Therefore, what is needed is receiver front-end apparatus that includes a single antenna that can also serve multiple standards without the above mentioned limitations.

BRIEF SUMMARY

In one embodiment, a radio receiver is configured to process multiple wireless standards using a single antenna. The radio receiver includes a single antenna, and a low noise amplifier is connected to the antenna, without an intervening power divider or power splitter. The output of the low noise amplifier feeds multiple wireless receivers in a parallel arrangement that are operating according to different communications standards, including for example a Bluetooth receiver and a WLAN 802.11 receiver. Additional wireless standards and their corresponding receivers could be added as well. The input impedance of the low noise amplifier defines the impedance seen by the antenna, regardless of which operational standard is actually in use. Each signal path (.e.g. Bluetooth or WLAN) includes an additional low noise amplifier having a gain that can be customized for the particular signal path, and which also improves the reverse isolation between signal paths. Further, a switch can be added to one or more of the signal paths so as to further improve isolation when a particular path is not being used.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1 illustrates a conventional radio receiver configured for multi-standard operation using a single antenna and power divider.

DETAILED DESCRIPTION OF THE INVENTION

A receiver configuration is proposed having a shared properly terminated LNA that is hooked up to the antenna (or other necessary RF components) without an intervening power splitter, so as to service at least two wireless communication standards. The amplified input signal is then split between the two signal paths after the first LNA (LNA-1) on chip, where there is no need to maintain 50 ohm terminations. No physical power splitter is used. Two additional LNAs (LNA-2 and LNA-3) are added, one in each of the corresponding signal paths defined at the output of the first LNA-1. Each one of these LNAs (LNA-2 and LNA-3) can have a different and independent gain control to allow for a flexible RF gain control scheme. Further, the reverse isolation of each one of these LNAs, achieved for example, through a simple or double cascode configuration can provide significant local oscillator feedthrough (LOFT) isolation from one core's mixers to the other core in order to avoid desensitization due to the other local oscillator. In other words, the mixers and corresponding local oscillators for one standard will not affect the mixers and corresponding local oscillators for the other standard, and vice versa.

Figure 2:
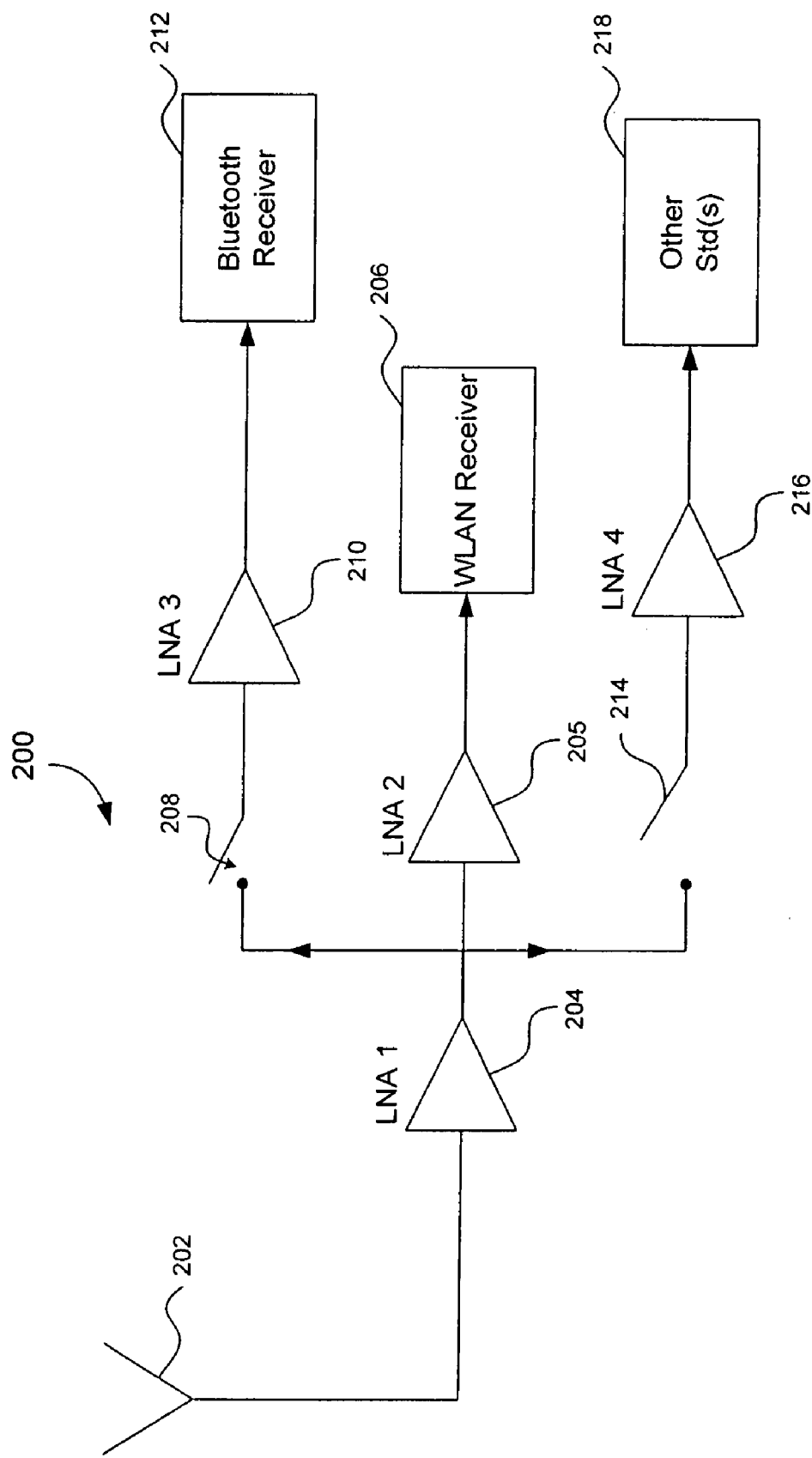
FIG. 2 further illustrates a radio receiver configured for multi-standard operation using a single antenna that does not include a power divider according to embodiments of the present invention.

FIG. 2 illustrates a radio receiver 200 configured to process multiple wireless standards using a single antenna according to embodiments of the invention. Receiver 200 includes a single antenna 202, a low noise amplifier-1 (LNA-1) 204, low noise amplifier-2 (LNA-2) 205, low noise amplfier-3 (LNA-3) 210, a WLAN receiver 206, and a Bluetooth receiver 212. The low noise amplifier 204 is connected directly (or through some additional RF components like switches, diplexers, filters, etc.) to the antenna 202, without an intervening power divider or power splitter. The output of the low noise amplifier 204 feeds both a Bluetooth receiver 206, and a WLAN 802.11 receiver 208, in a parallel arrangement as shown. Specifically, the LNA-2 205 receives the output from the LNA-1 204 to provide the received signal to the WLAN receiver 206. Likewise, the LNA-3 210 receives the output from the LNA-1 204 to provide the received signal to the Bluetooth receiver 212. A switch 208 is connected between the output of the LNA-1 204 and the input of the LNA-210 so as to provide additional isolation.

Additional wireless standards could be added as well. In other words, embodiments of the invention are not limited to serving only two standards. This is illustrated by a third path in FIG. 2 containing a switch 214, and an LNA-4 216 that provides the LNA-1 204 output to another standards receiver 218. Accordingly, there is no limit to the number of receivers and standards that can be serviced. For example purposes only, the following discussion only concentrates on Bluetooth and WLAN receivers for ease of discussion, but without limitation.

During operation, the antenna 202 receives an input signal that is amplified by the LNA 204 to produce an amplified input signal that is fed to both the Bluetooth receiver 212, and to the WLAN receiver 206. LNA-2 205 amplifies the output of the LNA-1 204 and provides the resulting output to the WLAN receiver 206. Likewise, LNA-3 210 amplifies the output of the LNA-1 204 and provides the amplified output to the Bluetooth receiver 212 through the switch 208. The switch 208 is closed when the Bluetooth receiver 212 is operating, and Bluetooth is the selected mode of operation. The respective gains of the LNA-2 205 and LNA-3 210 can be independently adjusted so as to provide individualized gains for the Bluetooth path and the WLAN path.

The input impedance of the amplifier 204 defines the impedance seen by the antenna 202 regardless of which operational standard is actually in use. Since the input impedance of the LNA 204 is independent of whether the Bluetooth or WLAN paths are ON or OFF, simultaneous operation can be accomplished. Alternatively, each one of the two paths can be completely powered off (while LNA-1 204 is operating) to save power with minimal impact to the impedance match as seen by the outside world. In other words, since the LNA-1 204 defines the impedance seen by the antenna 202, one or both of the Bluetooth receiver or the WLAN receiver can be powered off, without effecting the input impedance seem by the antenna.

For example, when Bluetooth is selected, LNA-2 205 and the rest of the WLAN path can be powered off as necessary to save power, while LNA-3 210 and the entire Bluetooth path is powered up. When WLAN is selected, LNA-3 210 and the rest of the Bluetooth path can be powered off to save power, while LNA-2 and the entire WLAN path is powered up. The receivers for any other standards can also be powered off. The impedance as seen by the outside world (at the LNA-1 204 input) will not be impacted in either case, because LNA-1 204 remains powered up. One skilled in the art will understand that this procedure can be extended to additional standards and receivers as needed (e.g. receivers 218).

Further, the amplifiers 210 and 205 provide a reverse isolation between the Bluetooth receiver 212 and the WLAN receiver 206, so that the local oscillator signal generated in the Bluetooth receiver does not effect the WLAN receiver, and vice versa. The switch 208 can also opened to further improve isolation. This undesirable coupling often occurs due to limited isolation between the local oscillator port and the RF port of the mixers which often follow the LNAs.

In contrast to FIG. 1, the receiver 200 does not include a power divider as discussed above. Without the use of a power divider, there is no 3-dB power loss at the output of the LNA 204, assuming two receivers operating. In other words, if one of the Bluetooth receiver 212, or WLAN receiver 206 is turned off, then approximately all of the LNA output power will be transferred to the operating receiver (taking into account any mismatch loss).

Figure 3:
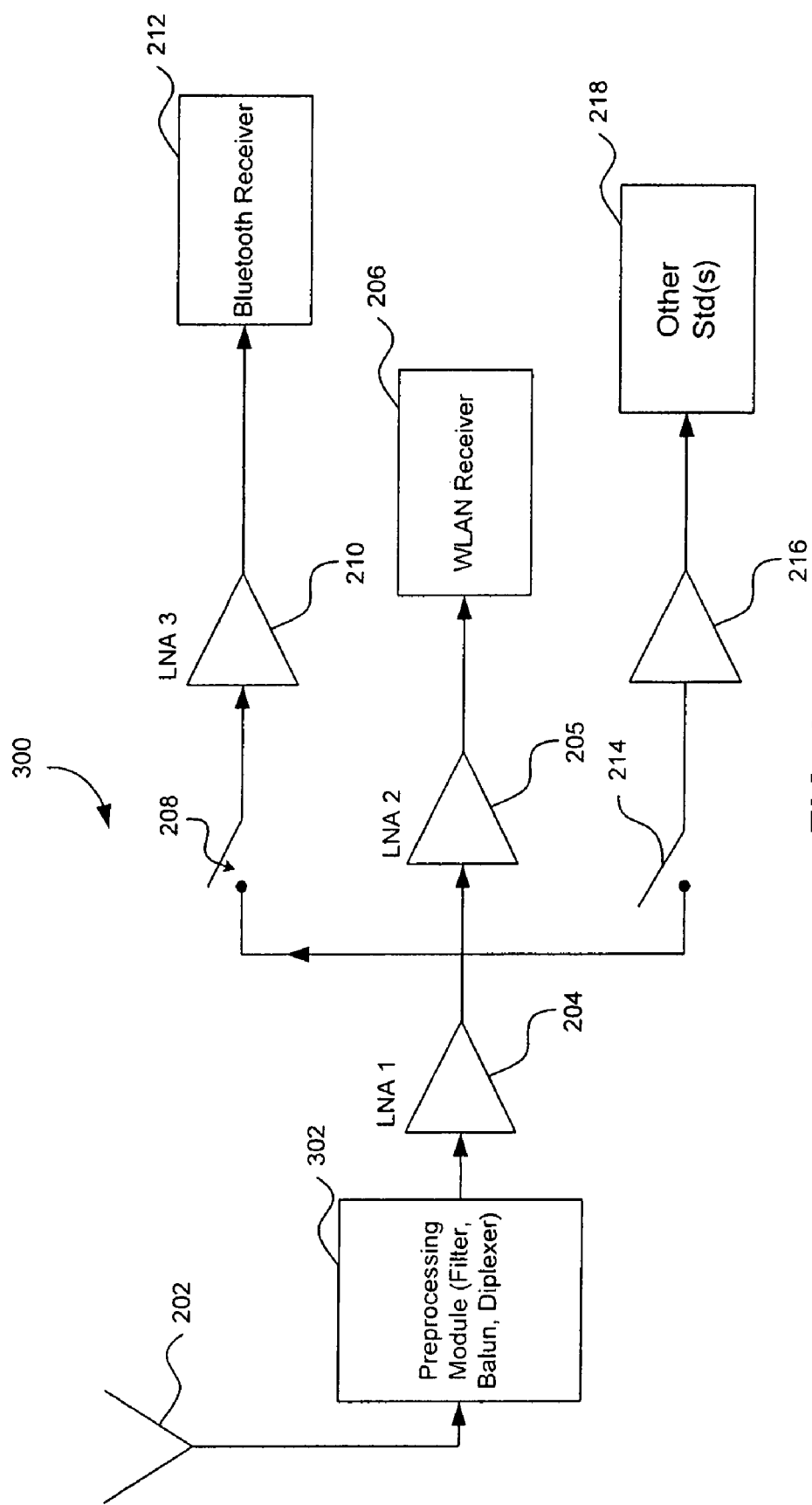
FIG. 3 further illustrates a radio receiver configured for multi-standard operation using a single antenna and a pre-processing module, but does not include a power divider according to embodiments of the present invention.

FIG. 3 illustrates a second embodiment of the invention having a radio receiver 300, where a pre-processing module 302 is optionally coupled between the antenna 202 and the input of the LNA-1 204. The pre-processing module 302 can operate as any one of a filter (e.g. lowpass or bandpass filter), a diplexer, a balun, a switch, or another type of receiver preprocessing circuit. The pre-processing module 302 is generally configured to have a sufficient bandwidth so as to pass necessary frequencies to support the communications standards for the receivers 206, 212, or 218, or any other standard meant for use in the radio receiver 300.

The radio receiver 300 operates similar to the radio receiver 200 except that the input impedance of the pre-processing module 302 is preferably matched to the antenna, taking into the consideration impedance of the LNA-1 204 when powered on.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A radio receiver, comprising:
   an antenna;
   a first low noise amplifier (LNA) connected to an output of said antenna;
   a second LNA having an input directly coupled to an output of said first LNA, and a third LNA having an input coupled to said output of said first LNA through a switch, said switch connected between the output of the first LNA and the input of the third LNA;
   a first circuit corresponding to a first wireless standard coupled to an output of said second LNA; and
   a second circuit corresponding to a second wireless standard coupled to an output of said third LNA.

2. The radio receiver of claim 1, wherein said first wireless standard is Bluetooth, and said second wireless standard is WLAN IEEE 802.11.

3. The radio receiver of claim 1, wherein an input impedance of said first LNA is matched to an output impedance of said antenna.

4. The radio receiver of claim 1, wherein said first circuit and said second circuit are coupled to said output of said antenna without an intervening power divider.

5. The radio receiver of claim 1, wherein said first circuit is a Bluetooth radio receiver, and said second circuit is a WLAN 802.11 radio receiver.

6. The radio receiver of claim 1, further comprising:
   a fourth LNA having an input coupled to an output of said first LNA;
   a third circuit corresponding to a third standard coupled to an output of said first LNA.

7. The radio receiver of claim 1, wherein said second circuit and said third LNA are powered off when said radio receiver receives an input signal corresponding to said first wireless standard.

8. The radio receiver of claim 1, wherein said switch is opened when said radio receiver receives an input signal corresponding to said first wireless standard.

9. The radio receiver of claim 1, wherein said switch is closed and said first circuit and said second LNA are powered off when said radio receiver receives an input signal corresponding to said second wireless standard.

10. The radio receiver of claim 1, wherein said first and second circuits and said second and third LNAs are powered off, when neither said first wireless standard or said second wireless standard is operational.

11. The radio receiver of claim 1, wherein said first LNA maintains an impedance match to said antenna even when at least one of said first and second circuits and their corresponding LNAs are powered off.

12. The radio receiver of claim 1, wherein respective gains of said second and third LNAs can be customized based on the needs of said respective first and second wireless standards.

13. A radio receiver, comprising:
an antenna;
a pre-processing module coupled to an output of said antenna;
a first low noise amplifier (LNA) connected to an output of said pre-processing module;
second and third LNAs coupled to an output of said first LNA, said second LNA having an input coupled directly to said output of said first LNA;
a switch connected to an output path of the first LNA between the output of the first LNA and the input of the third LNA;
a first circuit corresponding to a first standard wireless communication protocol coupled to an output of said second LNA; and
a second circuit corresponding to a second standard wireless communication protocol coupled to an output of said third LNA;
wherein said second circuit and said third LNA are powered off when said radio receiver receives an input signal corresponding to said first wireless standard.

14. The radio receiver of claim 13, wherein said pre-processing module is one is one of the following: a filter, a diplexer, a switch, and a balun.

15. The radio receiver of claim 13, wherein said first standard wireless communication protocol is Bluetooth, and said second standard wireless communication protocol is WLAN IEEE 802.11.

16. The radio receiver of claim 13, wherein an input impedance of said pre-processing module is matched to an output impedance of said antenna.

17. The radio receiver of claim 13, wherein said first circuit is a Bluetooth radio receiver, and said second circuit is a WLAN 802.11 radio receiver.

18. The radio receiver of claim 13, further comprising:
a fourth LNA having an input coupled to an output of said first LNA;
a third circuit corresponding to a third standard coupled to an output of said first LNA.

19. The radio receiver of claim 13, wherein said switch is opened when said radio receiver receives an input signal corresponding to said first wireless standard.

20. The radio receiver of claim 13, wherein said switch is closed and said first circuit and said second LNA are powered off when an input signal corresponding to said second wireless standard is received by said radio receiver.

21. The radio receiver of claim 13, wherein said first and second circuits and said second and third LNAs are powered off, when neither said first wireless standard or said second wireless standard is operational.

22. The radio receiver of claim 13, wherein said first LNA maintains an impedance match to said antenna even when at least one of said first and second circuits are powered off.

23. The radio receiver of claim 13, wherein respective gains of said second and third LNAs can be customized so as to correspond to respective first and second wireless standards.

24. A radio receiver, comprising:
a first low noise amplifier (LNA);
a second LNA having an input directly coupled to an output of said first LNA, and a third LNA having an input coupled to said output of said first LNA through a switch, said switch connected between the output of the first LNA and the input of the third LNA;
a first circuit corresponding to a first wireless standard coupled to an output of said second LNA; and
a second circuit corresponding to a second wireless standard coupled to an output of said third LNA;
wherein said switch is opened and said second circuit and said third LNA are powered off when said radio receiver receives an input signal corresponding to said first wireless standard.

25. The radio receiver of claim 24, wherein said switch is closed and said second circuit and said third LNA are powered on when said radio receiver receives an input signal corresponding to said second wireless standard.

26. The radio receiver according to claim 1, wherein the switch is disposed on an output path of the first LNA between the output of the first LNA and the input of the second LNA.

27. The radio receiver according to claim 1, further comprising:
a second switch; and
a fourth LNA having an input coupled to the output of the first LNA through the second switch.

28. The radio receiver according to claim 18, further comprising:
a second switch disposed on an output path of the first LNA between the output of the first LNA and the input of the fourth LNA.

29. The radio receiver according to claim 24, wherein the switch is disposed on an output path of the first LNA between the output of the first LNA and the input of the third LNA.

* * * * *

UNITED STATES PATENT AND TRADEMARK OFFICE
CERTIFICATE OF CORRECTION

| | | |
|---|---|---|
| PATENT NO. | : 8,121,564 B2 | Page 1 of 1 |
| APPLICATION NO. | : 11/711721 | |
| DATED | : February 21, 2012 | |
| INVENTOR(S) | : Arya Behzad | |

It is certified that error appears in the above-identified patent and that said Letters Patent is hereby corrected as shown below:

In Column 5, line 42, delete "is one," first occurrence.

Signed and Sealed this
Fifteenth Day of May, 2012

David J. Kappos
*Director of the United States Patent and Trademark Office*